(No Model.)

D. D. JONES.
FRUIT GRADER.

No. 424,002. Patented Mar. 25, 1890.

Witnesses,
J. H. Touse
H. C. Lee.

Inventor,
David D. Jones
By Dewey & Co.
Attys

UNITED STATES PATENT OFFICE.

DAVID D. JONES, OF SANTA CLARA, CALIFORNIA.

FRUIT-GRADER.

SPECIFICATION forming part of Letters Patent No. 424,002, dated March 25, 1890.

Application filed November 4, 1889. Serial No. 329,233. (No model.)

*To all whom it may concern:*

Be it known that I, DAVID D. JONES, a citizen of Great Britain, residing at Santa Clara, Santa Clara county, State of California, have invented an Improvement in Fruit-Graders; and I hereby declare the following to be a full, clear, and exact description of the same.

My invention relates to the class of machines for separating fruit according to sizes, and usually known as "fruit-graders;" and my invention consists in the constructions and combinations of devices which I shall hereinafter describe and claim.

Figure 1:
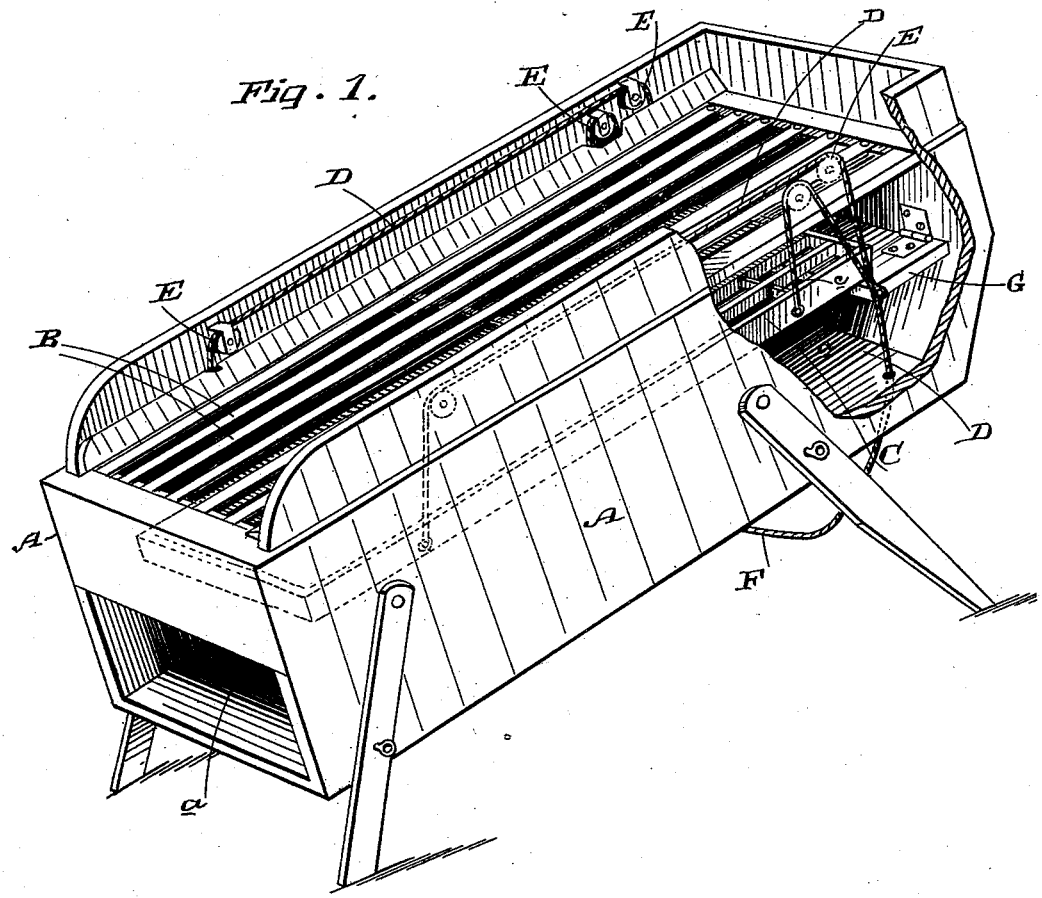
Figure 2:
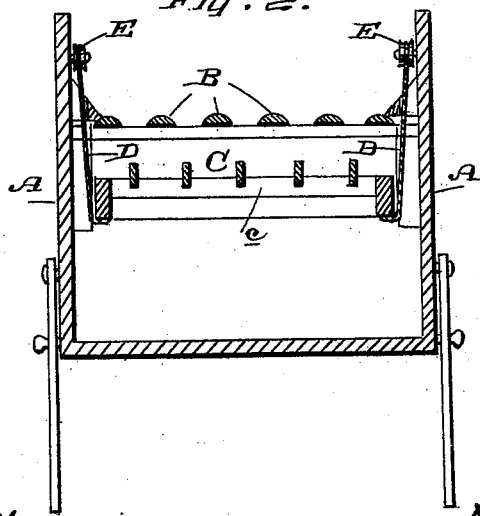

Referring to the accompanying drawings for a more complete explanation of my invention, Figure 1 is a perspective view of my fruit-grader, the frame at the head being broken away to show the interior. Fig. 2 is a vertical cross-section of same.

A is the frame of the machine, having mounted in its upper portion the grated surface B. This surface has a downward inclination, and consists of parallel spaced bars, the spaces between which are of equal width from end to end, so that fruit below a certain size will drop through, and all fruit above said size will remain on the surface.

Although I have here shown but one grated surface, it is obvious that I may have a vertical series of such surfaces, the spaces between the bars of which shall vary in width, so as to effect a more extensive grading.

Mounted in the frame A, below the grated surface B, is a rack C, consisting of parallel spaced slats, extending the entire length of the rack and lying in vertical planes directly below the spaces between the bars of the grated surface, so that when said rack is raised its slats will rise up between the bars of the grated surface. The vertical adjustment of this rack is accomplished by means of ropes or cords D, secured to the ends of the rack at each side thereof and passing up along the sides of the frame over suitable guide-pulleys E, and down at the head of the frame, where they are joined on each side and form a loop F below the head of the machine, in which the foot may be placed or to which a treadle may be attached for the purpose of pulling on the ropes to raise the rack.

The upward movement of the rack is limited by cross-strips c of said rack, which by coming in contact with the under side of the bars of the grated surface, arrest the rack and allow it to project its slats just far enough above the bars to effect the purpose of disengaging the sticking fruit.

The joined ends of the ropes D, which form the loop F under the head of the frame, are attached to a leaf G, hinged to the frame end and adapted to be pulled up by the ropes under the end of the descending rack, whereby said rack is properly arrested in its downward movement.

The box or frame A below the rack is formed with an inclined bottom a, open at one end.

The operation of the grader is as follows: The fruit is placed in the box at its head, and falling upon the inclined grated surface B rolls down toward the lower end, and, in passing over said surface, fruit below a certain size drops through the spaces between the bars of the grated surface and through between the slats of the rack below and upon the inclined bottom of the box and is discharged into a suitable receptacle at the end of the box. The fruit, above a certain size, failing to pass through the grated surface passes down over the end and is received in a suitable receptacle. When any of the fruit sticks or clogs between the bars of the grated surface, the rack below is raised up so that its slats come up between the bars of the grated surface and thereby free the fruit whenever it is necessary. The spaces between the slats are wider than the spaces between the bars, and the former therefore present no obstruction to the passage of the fruit.

I am aware that in fruit-graders arms have been placed below the holes of the grading-surface, and have been caused by suitable devices to come up through said holes to carry the fruit from one hole to the other; but this is not my invention, and I do not claim such, broadly; but What I do claim as new, and desire to secure by Letters Patent, is—

1. In a fruit-grader, the combination of a suitable frame, a grated surface consisting of parallel spaced bars mounted in the upper portion of the frame, and a vertically-movable rack under said surface and consisting of spaced parallel slats lying in the vertical planes of the spaces between the bars of the grated surface, and the cross-strips c of said rack for limiting its upward movement by contact with the bars of the grated surface, and means for raising said rack to cause its slats to come up between the bars of the grated surface, substantially as described.

2. In a fruit-grader, the combination of the frame, the inclined grated surface in the upper portion thereof and consisting of parallel spaced bars, the rack in said frame under the grated surface and consisting of parallel spaced slats lying in the vertical planes of the spaces between the bars of the grated surface, whereby they come up between said bars, and the means for raising the rack consisting of the ropes connected at the sides of each end of the rack, said ropes passing up over suitable pulleys and down under the head of the frame, substantially as herein described.

3. In a fruit-grader, the combination of the frame, the inclined grated surface B, the underlying rack C, having the cross-strips c, the ropes D, secured to said rack and joined at their head to form loop F, and the swinging stop leaf G under the head of the rack and to which the ropes are attached, substantially as described.

In witness whereof I have hereunto set my hand.

DAVID D. JONES.

Witnesses:
JAMES B. CAPP,
ALBERT A. DREW.